June 3, 1930.  A. CUTLER  1,761,104
CARVING BRACE
Original Filed March 3, 1927
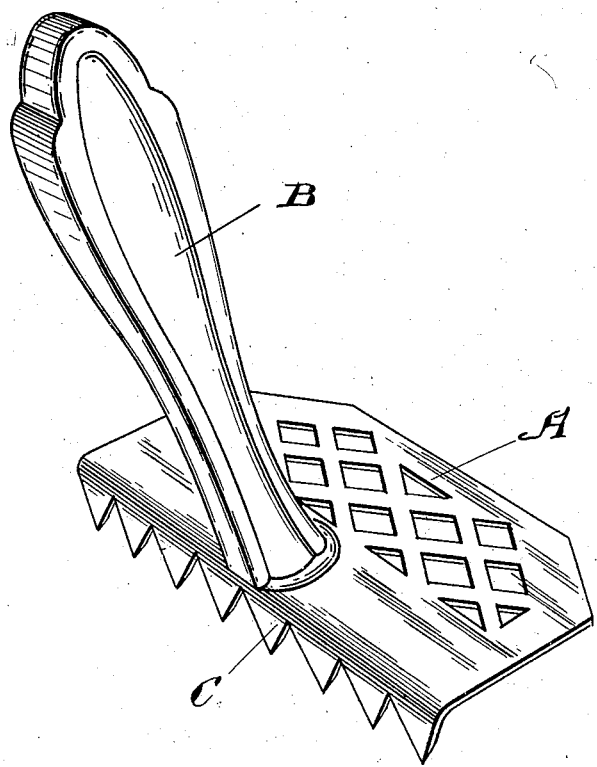
Inventor
Archibald Cutler
by Smith Leamum
his Attorneys Patented June 3, 1930

1,761,104

UNITED STATES PATENT OFFICE

ARCHIBALD CUTLER, OF TORONTO, ONTARIO, CANADA

CARVING BRACE

Application filed March 3, 1927, Serial No. 172,527, and in Canada November 30, 1926. Renewed November 29, 1929.

My invention relates to a carving brace or an implement adapted to be used in the place of an ordinary standard form of carving fork. Its object being especially adapted to maintain steady, and to evade twisting or turning, meat and the like edibles when carving, particularly when the meat is in the form of a roast.

The method of using the device is similar to that of an ordinary fork, with the exception that the contact with the meat is more or less by pressure, than by insertion.

In the drawings I show a perspective view of the device.

Like letters of reference refer to like parts throughout the drawings.

The brace comprises a flat pressure or contact plate A, in size, convenient to engage over a considerable portion of the meat to be carved, and adapted to be firmly pressed down thereon, to prevent the meat from turning or twisting, when being carved.

B designates an operating handle extending upwardly at an angle, and slightly rearwardly from the back edge of the plate A, to facilitate in convenient manipulation, both as to pressing against the meat, and to prevent displacing when carving.

Formed along and depending from the back edge of the plate A are a series of teeth or tines C, adapted to embed into the meat when pressure is applied by the handle B. The embedding of the tines C prevents all shipping and displacement and also aids in preventing the meat from twisting or slipping, when being carved.

The plate A may be embossed or perforated in any ornamental manner, to improve the appearance, and to allow it to impress into the meat, as a further means for preventing displacement, when the plate is firmly pressed down against the meat.

The handle B may be permanently soldered to the plate A, or may be detachably secured thereto by any ordinary screw fastening, whereby it may be changed to correspond with various designs of flat ware with which it may be used.

What I claim as new and desire to secure by Letters Patent, is:

A carving brace comprising a flat pressure plate adapted to engage over the meat, an operating handle formed with the said plate and extending upwardly and rearwardly therefrom, a series of tines formed with the rear edge of the said plate and depending therefrom, the said plate adapted to be pressed down against the meat and embed said tines therein to prevent slipping or displacing when being used for steadying the meat for carving, substantially as described.

Signed at Toronto, this 19th day of February, 1927.

ARCHIBALD CUTLER.